(12) United States Patent
Chapman et al.

(10) Patent No.: US 10,447,043 B2
(45) Date of Patent: Oct. 15, 2019

(54) VERIFYING STATUS OF A TERMINATION END CAP OF A MICROINVERTER CHAIN

(71) Applicant: SunPower Corporation, San Jose, CA (US)

(72) Inventors: Patrick L Chapman, Austin, TX (US); Philip Rothblum, Austin, TX (US)

(73) Assignee: SunPower Corporation, San Jose, CA (US)

( * ) Notice: Subject to any disclaimer, the term of this patent is extended or adjusted under 35 U.S.C. 154(b) by 470 days.

(21) Appl. No.: 15/163,359

(22) Filed: May 24, 2016

(65) Prior Publication Data

US 2017/0346293 A1 Nov. 30, 2017

(51) Int. Cl.
*H02J 1/00* (2006.01)
*H02J 3/00* (2006.01)
*H02J 3/38* (2006.01)
*G01R 31/02* (2006.01)
*H02S 50/10* (2014.01)

(52) U.S. Cl.
CPC .............. *H02J 3/383* (2013.01); *G01R 31/02* (2013.01); *H02S 50/10* (2014.12); *Y02E 10/563* (2013.01)

(58) Field of Classification Search
CPC .................................. H02M 7/44; H02J 3/383
See application file for complete search history.

(56) References Cited

U.S. PATENT DOCUMENTS

| 9,423,448 | B1 * | 8/2016 | Naiknaware | G01R 31/405 |
| 2010/0308660 | A1 * | 12/2010 | Willis | G05F 1/67 307/77 |
| 2012/0119755 | A1 * | 5/2012 | Ishii | G01R 27/025 324/551 |
| 2013/0009483 | A1 * | 1/2013 | Kawate | H02J 3/383 307/77 |
| 2013/0346054 | A1 * | 12/2013 | Mumtaz | H02J 3/383 703/13 |
| 2014/0307658 | A1 * | 10/2014 | Vedantham | H04W 74/0816 370/329 |
| 2014/0369098 | A1 * | 12/2014 | Li | H02S 40/32 363/95 |
| 2015/0085542 | A1 * | 3/2015 | Li | H02M 7/44 363/95 |

(Continued)

OTHER PUBLICATIONS

Phoenix Contact—Connection technology for micro inverters; Middletown, PA 17057 https://www.phoenixcontact.com/online/portal/us?1dmy&urile=wcm:path:/usen/web/main/products/subcategory_pages/photovoltaic_plug-in_connectors_p-20-06/33fa787b-e64f-4d64-8384-e8edd9152356/33fa787b-e64f-4d64-8384-e8edd9152356; Captured May 5, 2016.

(Continued)

*Primary Examiner* — Alfonso Perez Borroto
*Assistant Examiner* — Esayas G Yeshaw
(74) *Attorney, Agent, or Firm* — Grasso PLLC (57) ABSTRACT

A photovoltaic (PV) system includes a system control module that determines the presence of a microinverter chain termination end cap. The end cap includes an embedded circuit. The embedded circuit includes components having resistive, reactive, or impedance values. A signal source provides a signal through the microinverter chain. A parameter for a sensed signal detected by the system control module is used to determine the presence of the end cap using a change between the parameter for the sense signal and a reference parameter.

18 Claims, 5 Drawing Sheets

(56) References Cited

U.S. PATENT DOCUMENTS

| | | | | |
|---|---|---|---|---|
| 2015/0295511 A1* | 10/2015 | Veeraraghavan | ....... | H02M 7/44 |
| | | | | 363/95 |
| 2016/0097685 A1* | 4/2016 | Blemel | ................ | H01H 71/145 |
| | | | | 374/57 |
| 2017/0047742 A1* | 2/2017 | Narla | ....................... | H02J 3/385 |
| 2017/0179724 A1* | 6/2017 | Lam | ........................ | H02J 3/382 |
| 2017/0336821 A1* | 11/2017 | Ramezan Pour Safaei | ................. | |
| | | | | G05B 15/02 |

OTHER PUBLICATIONS

Enphase Energy Installation Guide—M250 (M250-60-2LL) Safety—Quick Install Guide; Copyright 2013; Enphase Energy, Inc., Petaluma, CA 94954; http://www.enphase.com.

Enphase Energy—Enphase Engage Cable & Accessories—Installation Manual—141-00016, Rev 03; Copyright 2012; Enphase Energy, Inc., Petaluma, CA 94954; pp. 1-23.

Shoals Technologies Group—Installation and Configuration of the Solar Gateway; 133-400000-000-A000; SNAPshot powered by synapse; Shoals Technologies Group; Portland, TN; www.shoals.com; Captured May 5, 2016.

SunPower Corporation; Your SunPower Monitoring System Guide; Item #507444 RevG; Copyright 2014; www.sunpower.com.

P.L. Chapman, et al; Automated Commissioning and Inspection for PV Systems; U.S. Appl. No. 15/087,594, filed Mar. 31, 2016.

* cited by examiner

VERIFYING STATUS OF A TERMINATION END CAP OF A MICROINVERTER CHAIN

This invention was made with government support under DE-EE0006035 awarded by The U.S. Department of Energy. The government has certain rights in the invention.

BACKGROUND

Photovoltaic (PV) cells, commonly known as solar cells, are devices for conversion of solar radiation into electrical energy. Generally, solar radiation impinging on the surface of, and entering into, the substrate of a solar cell creates electron and hole pairs in the bulk of the substrate. The electron and hole pairs migrate to p-doped and n-doped regions in the substrate, thereby creating a voltage differential between the doped regions. The doped regions are connected to the conductive regions on the solar cell to direct an electrical current from the cell to an external circuit. When PV cells are combined in an array such as a PV module, the electrical energy collected from all of the PV cells can be combined in series and parallel arrangements to provide power with a certain voltage and current.

The costs associated with installation of PV components within a PV system may be broken into hard costs and soft costs. Hard costs are easily identifiable as those costs associated with equipment, such as PV panels microinverters, cabling, support framing, and so on. Soft costs relate to those costs that may not be easily identifiable, such as installer overhead costs, permitting costs, start-up testing, and local compliance issues. One such soft cost may include unique installation particulars for each site and can include the termination of cables or wires from a chain of multiple microinverters of a PV system to prevent electric shock hazards to handlers of the equipment and to prevent unwanted exposure to weather for the equipment itself.

DETAILED DESCRIPTION

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured to." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" solar cell does not necessarily imply that this solar cell is the first solar cell in a sequence; instead the term "first" is used to differentiate this solar cell from another solar cell (e.g., a "second" solar cell). Likewise, a first PV module does not necessarily imply that this module is the first one in a sequence, or the top PV module on a panel. Such designations do not have any bearing on the location of the PV module, substrings, and the like.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

In the following description, numerous specific details are set forth, such as specific operations, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present disclosure.

Embodiments may include the automated verification of the status of an end cap at the termination of a chain or microinverters for a PV system. This status may include the absence or presence of the end cap itself as well as whether the end cap is properly seated in its connection to the termination. In embodiments this verification may include electronic detection without the need for human intervention and this detection may be automated, performed periodically, and reported out from time to time or on an as requested basis. The electronic detection may be performed in embodiments in circuits employing logic level voltages as well as in circuits employing line voltages of 120 volts or more. The techniques and designs employed may differ depending upon the voltages of the circuits being tested. Common features of embodiments may include providing a signal into the PV system, receiving a sensed signal from the PV system and comparing that sensed signal to an expected parameter where the expected parameter can include attributes attributable to electronic circuit components from the end cap and how these components are expected to influence the sensed signal when the end cap is properly installed and is not properly installed.

In embodiments, voltage division may be used to detect the presence of end cap terminations. In these and other embodiments, an end cap may be modified with a resistive or reactive element. When a signal source and source termination is connected to the end cap, a sense voltage may be measured and compared with an expected voltage or other parameter in order to determine whether the end cap is present. For example, in embodiments, if the end cap is missing, the magnitude of the sense voltage measured by components within the system control module is identical to the magnitude of the driving signal source. Comparatively, in embodiments, when the end cap is present, the sense voltage is proportional to the ratio of the end cap impedance to the source termination impedance.

In some embodiments, resistors may be used for both the source impedance and the end cap impedance. A direct current (DC) signal source may be used such that the sense voltage is fed into the system control module. In some embodiments, the DC signal source may be an ohmmeter, or any resistance measuring device, that injects a low power DC signal. Preferably, the system control module includes an analog-to-digital (AD) converter.

In the case of resistive measurements, the resistive termination in the end cap could increase the power consumption of the PV system once the line voltage is connected. In certain preferred embodiments, the end cap or the nearby termination may be equipped with an electronic switch such that when the voltage exceeds a threshold, the resistive device is opened. Another possibility is to employ resistors with temperature coefficients. For example, a positive-temperature-coefficient (PTC) resistor may have a resistance that increases when its temperature increases. Thus, when the line voltage is placed across the end cap, the PTC resistor may absorb power and increase its temperature. The resistance will increase, thereby reducing the power consumption.

In some embodiments, reactive components may be used for both the source and the end cap terminations. The signal source should be alternating current (AC) and may operate at a higher frequency than 60 Hertz (Hz). The use of reactive components may result in no power loss when an end cap has been applied to the cables or wires. Switches are not typically required because the reactive element may provide high voltage isolation.

As with the resistive terminations, the variable impedance may be used via switches or other nonlinear behavior so that the reactance changes in the presence of the line voltage. For example, a capacitor may be implemented in the end cap. The impedance of the capacitor may cause a voltage difference between the source signal and the sensed signal. A capacitor may consume reactive power and increases current flow on the line. Even though the capacitor does not consume any real power, the increased current flow may cause losses elsewhere in the power system. It may be desirable to minimize the capacitance of the end cap termination when the voltage is above a threshold.

In some embodiments, AC modules may be implemented and Power Line Communications (PLC) may be used to communicate with the PV system electronics. The system control module may be configured to have access to a signal strength measurement circuit and in so doing a change in the received signal strength may be induced by proper selection of the end cap termination.

In embodiments, the PLC signals may have a higher frequency than the line voltage, preferably a much higher frequency. The length of the AC cables may cause transmission line effects, such as like reflections and wavelike behavior through the line. Accordingly, in embodiments, the end cap impedance may be tuned to alter the reflections or wavelike properties of the transmission line formed by the microinverter array so that the received signals in the system control module would be distinct from the case of signals received with no end cap present.

Thus, the disclosed embodiments provide processes and configurations for full automation of verifying the presence of the end cap in a PV system without the need for human intervention or visual inspection. In preferred embodiments the system control module may be used to control switches within the system to accommodate the presence of normal line voltages. The system control module also may invoke AD converter measurements of the sense signal. Using the received signals, the system control module may analyze the results and provide a report regarding the presence of the end cap termination.

Some embodiments may also comprise a method for remotely verifying a status of a microinverter chain termination end cap within a PV system. The method may include providing a signal to a microinverter chain within a PV system where the chain of microinverters within the PV system includes a termination end cap for the chain of microinverters. The method may also include using a system control module to sense the signal connected to the microinverter chain and using the system control module to detect a difference between the provided signal and the sensed signal. The method also includes determining the status of the end cap based on the change relative to an expected value or a value for a circuit including electronic components embedded in or otherwise fixed to the end cap.

In other embodiments, a system to verify a connection of a termination end cap to a microinverter chain within a PV system may be provided. The system may include a microinverter chain having at least one termination end connection. The system may also include an end cap attached to the termination end connection of the microinverter chain where the end cap can include an embedded circuit or associated circuit solely linked to the end cap. The system may also include a signal source coupled to the microinverter chain to provide a signal to the microinverter chain and a system control module coupled to the signal source to sense the signal and determine the connection status of the end cap based on a variance between a sensed signal relative to an expected value for the sensed signal when the end cap is properly installed at the termination end of the chain of microinverters.

In other embodiments, a device to verify a connection status of an end cap to a microinverter chain termination within a PV system may also be employed. The device may include a signal source to apply a logic level low voltage signal to a microinverter chain having the microinverter chain end cap termination. The device may include a system control module configured to remotely sense the signal and determine the presence of the end cap based on a difference between the sensed signal and an expected signal value considering the installation of the end cap at the termination.

Figure 1:
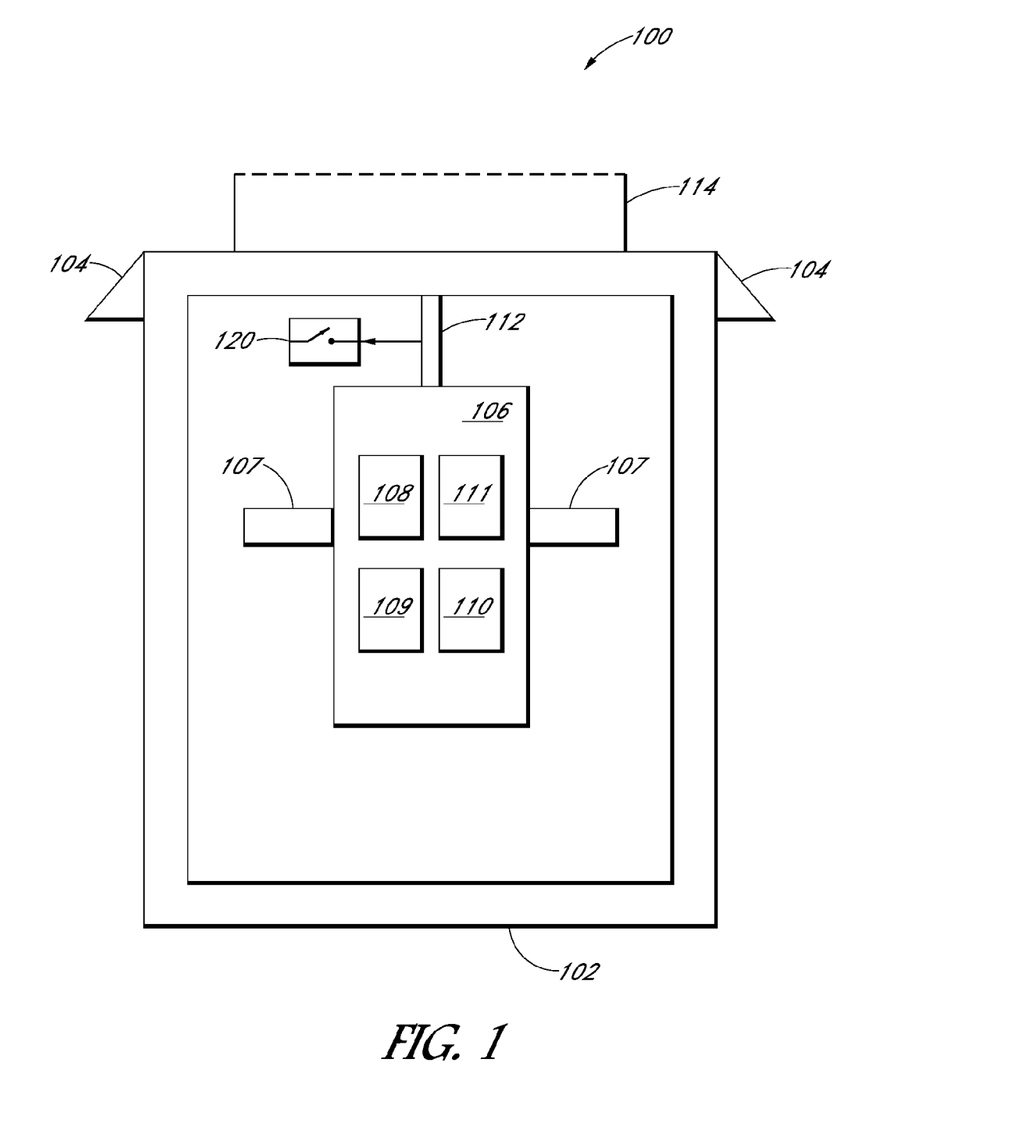
FIG. 1 illustrates an end cap for a termination of a chain of microinverters as may be employed in embodiments.

FIG. 1 depicts an end cap 100 for a microinverter chain termination end 114 according to some embodiments. End cap 100 may be attached to termination end 114 to prevent shock hazards and damage to the wire, cable, or termination by the environment. Termination end 114 may be a cable or wire extending from the last PV module in a microinverter chain within a PV system. In some embodiments, the microinverter chain includes more than one termination end 114. If end cap 100 is not present, then the installation of the PV system may fail inspection as termination end 114 is exposed.

End cap 100 includes a covering 102. Preferably, covering 102 is plastic to endure weather conditions and to be placed into the ground or a structure. Covering 102 may seal the components within end cap 100. End cap 100 also includes snaps 104 to attach with termination end 114. The disclosed embodiments may detect the status of end cap 100 by determining whether snaps 104 are attached to termination end 114.

Embedded circuit 106 is included in end cap 100. Embedded circuit 106 may be a circuit board having components 108, 109, 110, and 111. In some embodiments, only one of components 108-111 is included, while other embodiments may include additional components. Preferably, components in embedded circuit 106 are passive components. Examples of components 108-111 in embedded circuit 106 include a resistor, a capacitor, an inductor, a switch, and the like.

In some embodiments, end cap 100 itself may form the embedded circuit. In other words, end cap 100 provides an impedance that distinguishes from an open circuit. If end cap 100 is not in place, then termination end 114 may act like an open circuit. With end cap 100, the impedance of the cap is detectable versus an open circuit. Preferably, this embodiment of end cap 100 has a high impedance value. Further, end cap 100 may have a coating that makes the cap safer to touch and this coating may be resistive, capacitive, or both.

Embedded circuit 106 has a detectable value associated with it, such as resistance, impedance, reactance, and the like. The components therein may be adjusted to be at a certain value for use within the embodiments disclosed below. In other words, end cap 100 may have linear components tuned to provide a particular frequency upon receipt of a signal. These features are disclosed in greater detail below.

Embedded circuit 106 may be attached within end cap 100 to covering 102 by contacts 107. Two contacts 107 are shown in FIG. 1, but any number may be used. Contacts 107 may be metal. Connector 112 also connects embedded circuit 106 to termination end 114. Thus, when contacts 107 are engaged within end cap 100 and snaps 104 are attached, connector 112 couples embedded circuit 106 to termination end 114. Embedded circuit 106 may receive signals from the PV system through connector 112. Connector 112, in some embodiments, may include an electronic switch 120 that opens under certain conditions to protect embedded circuit 106.

Although the term "snaps" is used for reference number 104, any means to fasten end cap 100 to termination end 114 may be used. The disclosed embodiments are not limited to snaps. For example, end cap 100 may slide onto termination end 114 without the use of any snaps. End cap 100 may include a part of its covering 102 that causes friction to keep it in place. Screws or fasteners also may be used to attach end cap 100. Other configurations may also be employed. This affirmative connection may enable coupling of a circuit in the end cap only after the positive connection of the end cap has occurred. In other words, when the end cap is not properly seated, in some embodiments, the circuit of the end cap may not be engaged and an open circuit would be presented until such time as positive seating of the cap has occurred.

Figure 2:
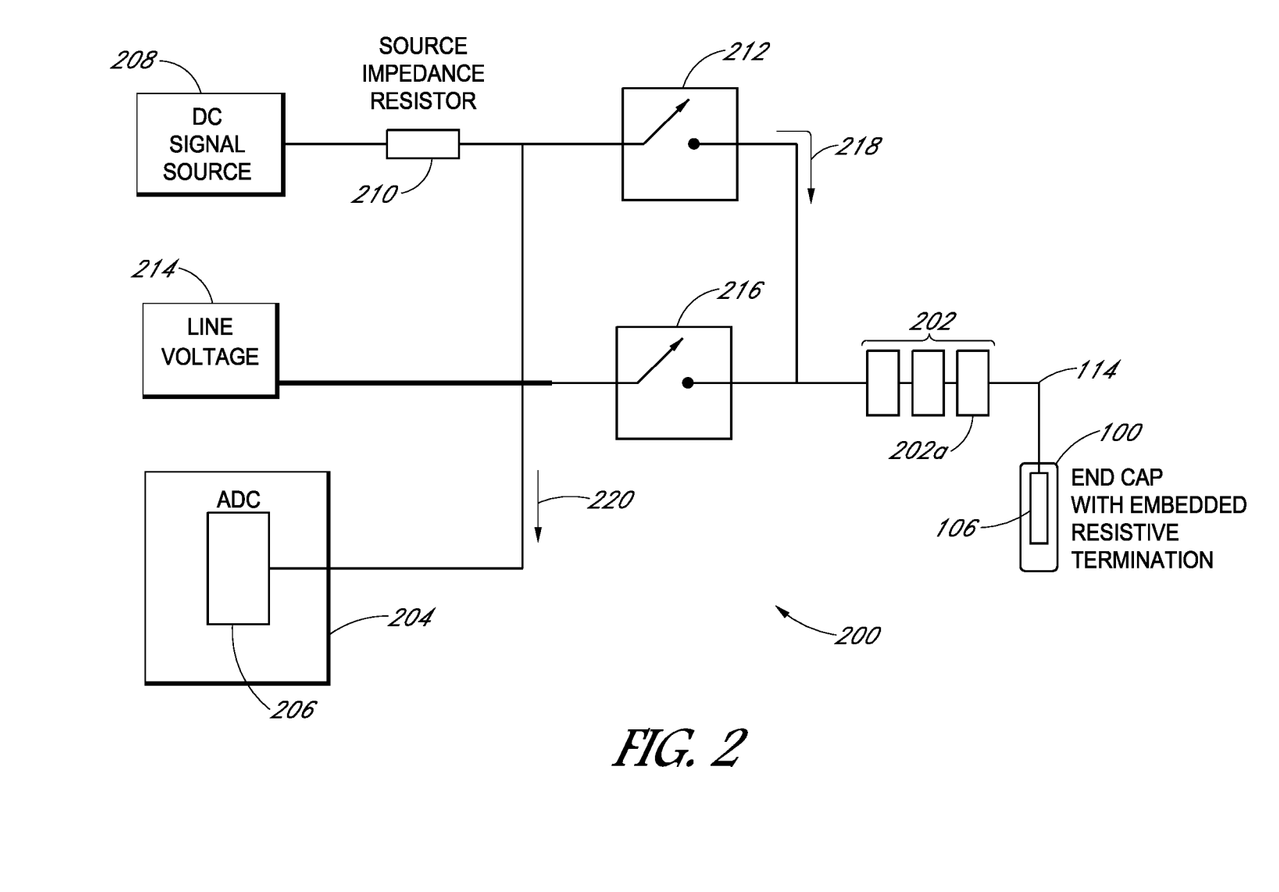
FIG. 2 illustrates a PV system having resistive terminations as may be employed in embodiments.

FIG. 2 depicts a PV system 200 having resistive terminations according to the disclosed embodiments. PV system 200 includes a chain of microinverters 202. Preferably, the microinverters are in PV modules (PV panel, PV panel frame, associated cabling) within PV system 200. Although three microinverters are shown in FIG. 2, any number may be included in the chain. Microinverters in chain 202 are connected to each other, except for end microinverter 202a. End microinverter 202a includes termination end 114 that is not attached to another microinverter.

Instead, termination end 114 is attached to end cap 100. Thus, during installation, end cap 100 should be present to prevent problems while PV system 200 is in use. The disclosed embodiments allow for electronic verification of the status of end cap 100. Preferably, the status is that end cap 100 is present. The status, however, may be that end cap 100 is not present or properly attached to termination end 114.

PV system 200 may perform the verification using system control module 204. System control module 204 may be a gateway that is able to monitor and perform analysis of components within system 200. System control module 204 includes at least one processor, memory, a data bus and other components to perform the functionality disclosed herein. For example, system control module 204 includes an AD converter 206 to receive and analyze signals.

PV system 200 also includes DC signal source 208 that injects a low power DC signal 218 into microinverter chain 202. Preferably, signal 218 is about 5 volts but may be other low logic level voltages. In some embodiments, DC signal source 208 is a resistance measuring device, such as an ohmmeter. DC signal source 208 includes or is coupled to source termination resistor 210. Source termination resistor 210 provides the source resistance used in the voltage division analysis by system control module 204 during the verification process. Switch 212 connects DC signal source 208 to microinverter chain 202.

In some embodiments, DC signal source 208 provides signal 218 to system control module 204. Signal 218 may be received by AD converter 206. In other embodiments, system control module 204 includes DC signal source 208, source termination resistor 210, and switch 212. Source 208 may be coupled directly to AD converter 206. In this instance, a button may be provided at system control module 204 to test for the presence of end cap 100.

Line voltage source 214 applies the line voltage to physical wires coupled to microinverter chain 202. The line voltage may be about 120 volts AC at 60 Hz, although other voltages and frequencies may be used for the line voltage signal. For PV system 200, it is preferred to not apply the line voltage while performing the verification for end cap 100. Thus, line voltage switch 216 prevents connection to microinverter chain 202 when DC signal source 208 is coupled through switch 212. Application of line voltage may result in low power signal 218 being overshadowed by the line voltage signal as well as possible damage to components within PV system 200.

Thus, when the verification process is being performed, system control module 204 may disconnect the line voltage from microinverter chain 202 via line voltage switch 216. Signal 218 is sent to end cap 100 through microinverter chain 202 by switch 212. Sense signal 220 is detected by AD converter 206.

Signals 218 and 220 have voltages. When end cap 100 is missing or not attached to termination end 114, the magnitude of the voltage for sense signal 220 is about the same as the voltage for signal 218. If end cap 100 is attached, then the voltage of sense signal 220 is proportional to the ratio of the resistance of embedded circuit 206 to the resistance of termination resistor 210. PV system 200 includes a resistance divider coupled to system control module 204 to detect the presence, or status, of end cap 100.

In these embodiments, embedded circuit 106 includes one or more resistors as components. The value of the component(s) within embedded circuit 106 provides the ratio that system control module 204 uses to analyze sense signal 220 with signal 218. Using the disclosed process, AD converter 206 determines a difference in voltages between the signals. Thus, for example, if end cap 100 is not attached, then sense signal 220 may be about 5 volts, or substantially equal to signal 218. If end cap 100 is attached, then the disparity in voltages of the signals may be about 2.5 volts, with sense signal 220 having a voltage of 2.5 volts. System control module 204 may then provide an automatic and confident indication of the status of end cap 100.

In PV system 200, the resistive termination of embedded circuit 106 may increase the power consumption of the system once line voltage source 214 is coupled to microinverter chain 202. Various alternatives may be employed to prevent the increased power consumption. For example, end cap 100 may be equipped with electronic switch 120. When the signal voltage received through termination end 114 exceeds a threshold, such as 10 volts for a 5 volt DC signal source 208, switch 120 is opened.

Other embodiments may use resistors with temperature coefficients as components in embedded circuit 106. For example, a PTC resistor may be used as one or more components 108-111. The PTC resistor has a resistance that increases when its temperature increases. Thus, when the line voltage is applied by line voltage source 214, the PTC resistor will absorb power and increase its temperature. The resistance will increase, which reduces power consumption by end cap 100. When the line voltage is not present, the resistance of the PTC resistor is low to allow detection of sense signal 220.

In some embodiments, PV system 200 includes multiple parallel branches having termination ends 114 and end caps 100. The ratios present between the branches may be used by system control module 204, or AD converter 206, to determine the presence of end caps 100 on the branches. As with the above example, the voltage of sense signal 220 is approximately the same as the voltage of signal 218 when end caps 100 are not present. Using the ratios between the resistance of termination resistor 210 and the resistances of embedded circuits 106, the voltage divider is formed for each branch. System control module 204 may measure sense signals 220 for each branch and use the ratios to determine when the corresponding end cap 100 is present. Thus, for two branches, system control module 204 may determine the differences between the signals and compare to the appropriate ratios, such as ⅓ and ⅔ voltage measurements of sense signals 220 when compared to signals 218.

Figure 3:
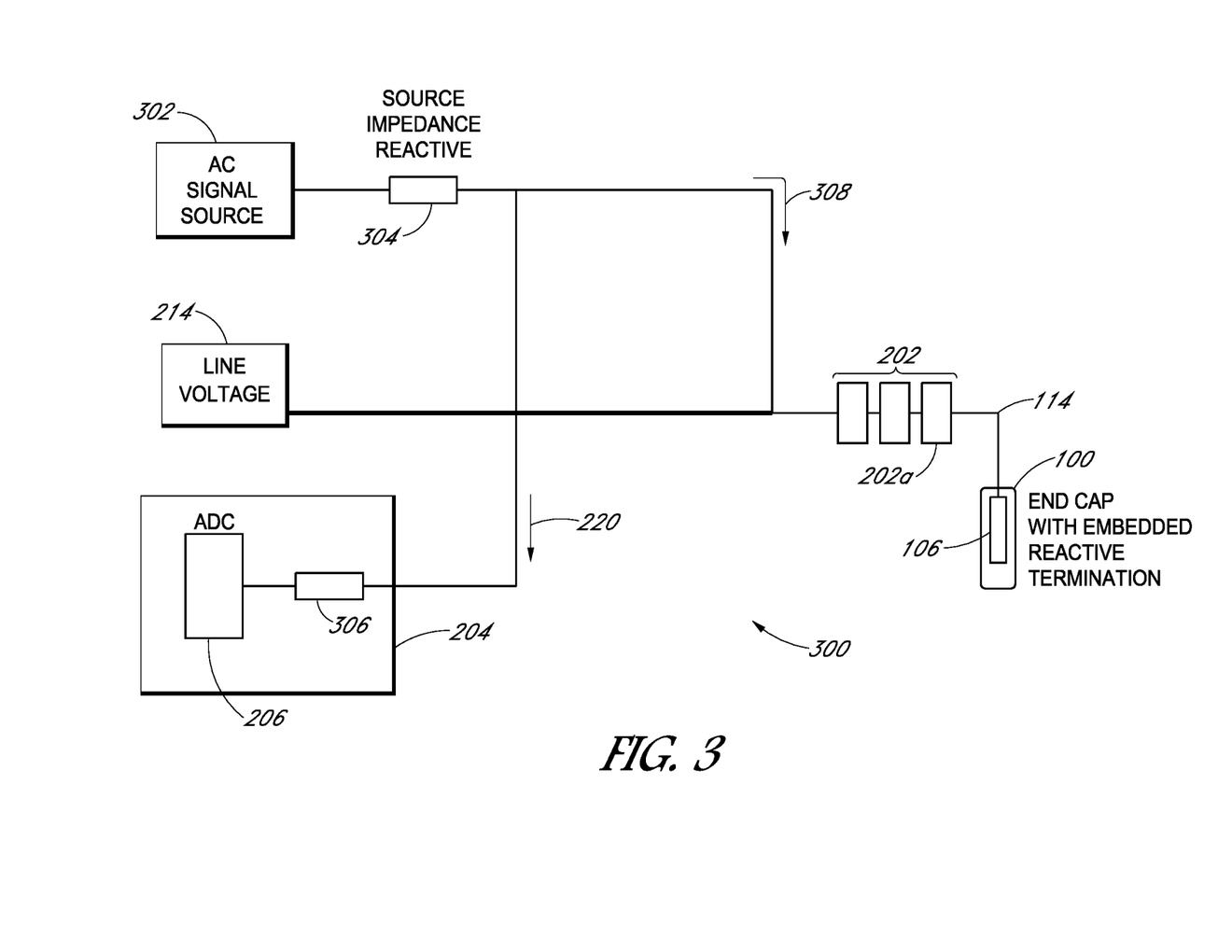
FIG. 3 illustrates a PV system having reactive terminations as may be employed in embodiments.

FIG. 3 depicts a PV system 300 having reactive terminations according to the disclosed embodiments. PV system 300 uses reactive components in performing the verification processes. Embedded circuit 106 includes reactive elements, such as capacitors, for components. As such, PV system 300 includes an AC signal source 302 that provides signal 308. Signal 308 may have an AC voltage. AC signal source 302 may operate at a higher frequency than the 60 Hz frequency for the line voltage. AC signal source 302 is coupled to microinverter chain 202 via source termination reactive component 304. In some embodiments, component 304 is a capacitor.

PV system 300 includes system control module 204 with AD converter 206. AD converter 206 may detect and analyze sense signal 220 relative to signal 308, as disclosed above. System control module 204, however, also includes rectifier 306 to rectify the voltage of sense signal 220. Preferably, rectifier 306 helps to digitize the measurement of the voltage.

PV system 300 include system control module 204 with AD converter 206. AD converter 206 may detect and analyze sense signal 220 relative to signal 308, as disclosed above. System control module 204, however, also includes rectifier 306 to rectify the voltage of sense signal 220. Preferably, rectifier 306 helps to digitize the measurement of the voltage.

As with PV system 200, system control module 204 determines a difference between the voltages of signal 308 and sense signal 220. PV system 300, however, utilizes AC voltage signals. The ratio of the impedance of termination reactive component 304 and the impedance of embedded circuit 106 may be used to determine whether a difference between the signals indicates the presence of end cap 100.

In embodiments, variable impedances may be used via capacitors, switches or other nonlinear behavior so that the reactance changes in the presence of the line voltage from line voltage source 214. For example, a capacitor in embedded circuit 106 consumes reactive power and increases current flow on the line. Even though the capacitor itself consumes no real power, the increased current flow may cause losses elsewhere in PV system 300. Thus, some embodiments may seek to minimize the capacitance of end cap 100 when the line voltage is above a threshold.

Figure 4:
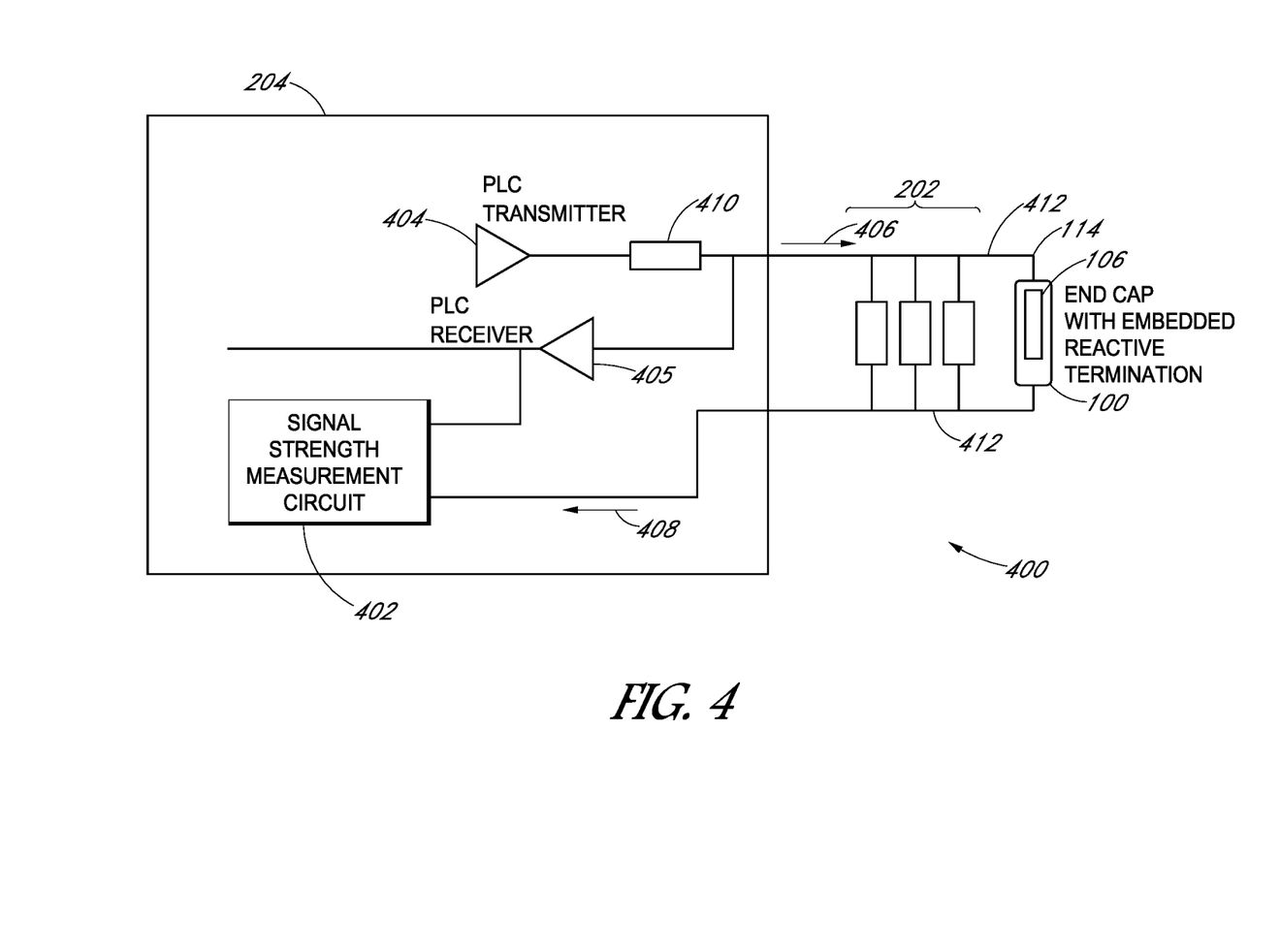
FIG. 4 illustrates a PV system having a microinverter implementation to determine a status of end cap as may be employed in embodiments.

FIG. 4 depicts a PV system 400 having a microinverter implementation to determine a status of end cap 100 according to some embodiments. PV system 400 is coupled to microinverter chain 202 and may be used for the specific implementation of AC modules. PV system 400 may use PLC to communicate with the electronics therein. System control module 204 includes a signal strength measurement circuit 402. A change in the received signal strength may be induced by the proper selection of the parameters for end cap 100.

System control module 204 includes PLC transmitter 404 and PCL receiver 405. PLC receiver 405 may be coupled to signal strength measurement circuit 402. PLC transmitter 404 generates signal 406 to microinverter chain 202 through filter 410. Signal 406 flows through end cap 100 and embedded circuit 106 to return to system control module 204 as sense signal 408. End cap 100 changes the strength of the signal using impedance within embedded circuit 106. Signal strength measurement circuit 402 determines the difference between the signals.

Preferably, PLC transmitter 404 generates a communication signal for signal 406. The PLC signals 406 and 408 may have higher frequencies than the line voltage. The length of AC cables 412 may cause transmission line effects. For example, microinverter chain 202 may include up to 12 microinverters for a 320 watt AC panel. The transmission line effects may include reflections and wavelike behavior. The impedance of embedded circuit 106 in end cap 100 may be tuned to alter the reflections or wavelike properties of cables 412 formed by microinverter chain 202 so that the received sense signal 408 would be distinct from the case with no end cap 100. Filter 410 may tune signal 406 as well so that it matches the impedance value of end cap 100.

In some embodiments, signal 406 does not want to be decimated. Thus, PV system 400 may send out a test signal to determine a value of sense signal 408 without end cap 100. PV system 400 then may send another signal with end cap 100 attached. The difference between signal strengths indicates whether end cap 100 is attached. Preferably, end cap 100 affects the amplitude of sense signal 408. The difference between amplitudes may indicate the status of end cap 100.

Figure 5:
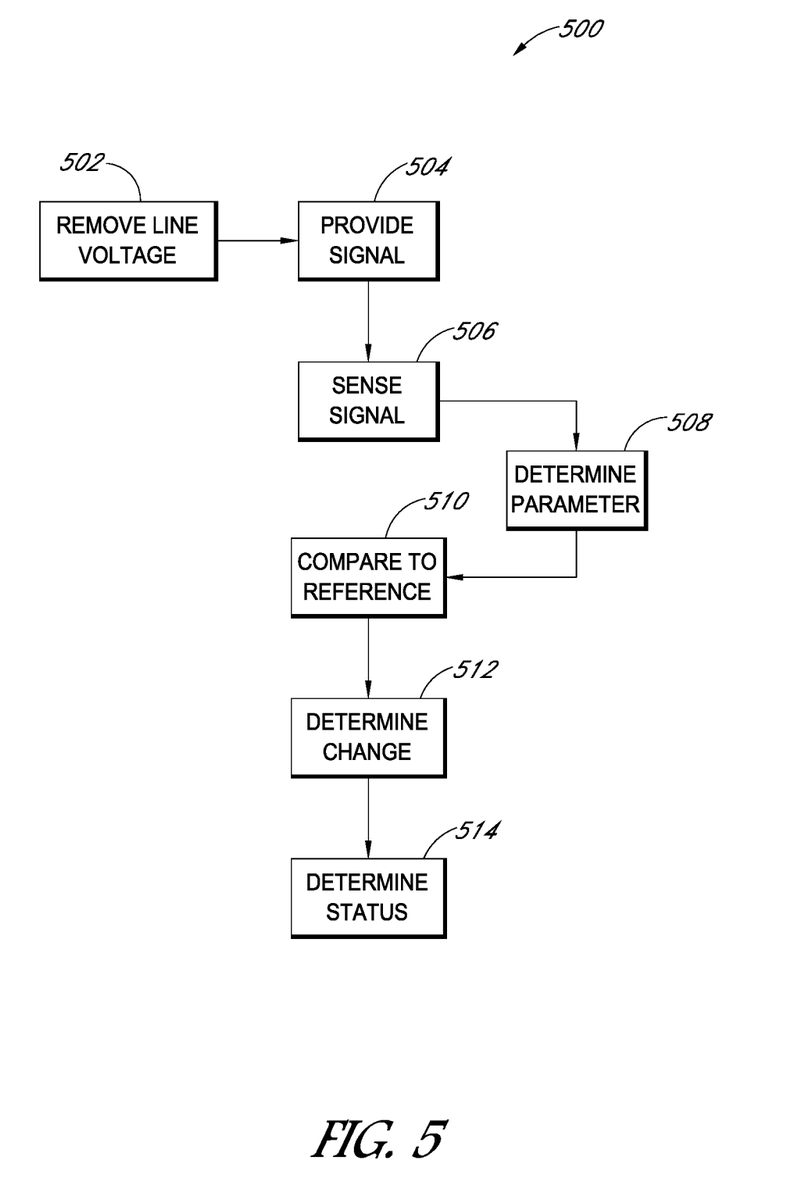
FIG. 5 illustrates a flowchart for verifying a status of a microinverter chain termination end cap within a PV system as may be employed in embodiments.

FIG. 5 depicts a flowchart 500 for verifying a status of a microinverter chain termination end cap 100 within a PV system according to some embodiments. The embodiments disclosed by flowchart 500 may be implemented by PV systems 200, 300, and 400. Where applicable, reference is made to elements disclosed in FIGS. 1-4 above for illustrative purposes. The embodiments disclosed by flowchart 500, however, are not limited to these examples.

Step 502 executes by removing the line voltage from microinverter chain 202, if applicable. In some embodiments, the line voltage should be removed before the verification process occurs. Removal of the line voltage may occur using switch 216 as instructed by system control module 204.

Step 504 executes by providing a signal to microinverter chain 202 from a signal source. In some embodiments, the signal may be a DC signal or an AC signal. Further, the signal may be a low power signal, as disclosed above. A switch 212 may be used to couple the signal source with microinverter chain 202. The signal flows through the applicable PV system and interacts with end cap 100, if present.

Step 506 executes by sensing a return, or sense, signal by system control module 204. In some embodiments, AD converter 206 may sense the signal. Step 508 executes by determining a parameter for the signal sensed by system control module 204. The parameter may be a voltage, current, signal strength or amplitude, and the like.

Step 510 executes by comparing the parameter of the sense signal to a reference parameter. In some embodiments, the reference parameter may relate to a value for the parameter when end cap 100 is not present on termination end 114. Step 512 executes by determining a change between the parameter of the sensed signal and the reference parameter. For example, the change may be a difference in voltages. In some embodiments, no change may be detected between the parameters.

Step 512 executes by determining a status of end cap 100 based on the change relative to a value from embedded circuit 106. As disclosed above, embedded circuit 106 may have a resistive value based on resistors, a reactive value based on reactive components, an impedance value based on linear or nonlinear components, and the like. The change between the parameters may relate to a ratio of the value between impedance in the signal source and the impedance in embedded circuit 106. If the change is minor, then end cap 100 may not be present.

Preferably, the disclosed processes may be executed by program instructions running on a processor or computing platform in system control module 204. System control module 204 would selectively engage the signal generation circuitry to microinverter chain 202. System control module 204 would sample or record measurements to infer the presence or absence of end cap 100. System control module 204 may then provide alerts or signal the results via input/output capabilities.

More than one AC module branch of microinverter chain 202 may be present in a PV system. Thus, more than one end cap 100 may be needed. The disclosed embodiments may be modified to detect the impedance of the multiple branches to reconcile against expected impedance. Alternatively, in combination with other hardware, such as a relay or other switching circuit, the branches may be switched on and off selectively to sense signals to determine the status of end cap 100.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for verifying a status of a termination end cap of a chain of microinverters of a photovoltaic (PV) system, the method comprising:
providing an electronic signal within a PV system, the provided signal used to test the status of a termination end cap of a chain of microinverters within the PV system;

using a system control module within the PV system to sense a parameter of the signal after the signal is provided to the termination end cap of the chain of microinverters;

using the system control module to detect a change between the sensed parameter of the provided signal and a reference parameter used to test the status of the termination end cap; and determining the status of the termination end cap based on the detected change, wherein the reference parameter is set using properties of a circuit that includes electronic components of the circuit located in the end cap.

2. The method of claim 1, further comprising:

removing a line voltage to the microinverter chain prior to providing the electronic signal, and wherein the status of the end cap is one or more of an operational status and a present status or not present status.

3. The method of claim 2, wherein the removing comprises removing the line voltage using a switch between a source of the line voltage and the microinverter chain.

4. The method of claim 1, wherein providing the source signal comprises providing a low voltage signal of 1.5 volts or 3 volts or 5 volts.

5. The method of claim 1, wherein the reference parameter is determined using an expected voltage drop across a resistive element in the termination end cap.

6. The method of claim 1, wherein providing the source signal comprises providing a logic-level voltage to the circuit located in the end cap.

7. The method of claim 1, wherein providing the signal to the microinverter chain comprises providing the signal using a switch; and wherein sensing the parameter of the signal using the system control module comprises sensing parameters of the signal with an analog-to-digital converter (ADC).

8. The method of claim 1, wherein detecting a change between the sensed parameter of the provided signal and a reference parameter used to test the status of the termination end cap comprises detecting the change between a signal strength of the sensed signal parameter and the signal strength of the reference signal parameter.

9. The method of claim 1, further comprising:

tuning a frequency of the reference signal parameter based on the value of the circuit that includes electronic components located in the end cap.

10. The method of claim 1 wherein the reference signal parameter is a value that indicates the presence of the end cap when the sensed signal parameter is above or below the value and the absence of the end cap when the sensed signal parameter shows the opposite indication above or below the value.

11. The method of claim 1, wherein the system control module includes a PLC transmitter, a PLC receiver, and a signal strength measurement circuit, the measurement circuit configured to determine the difference between PLC signals sent and received through the chain of microinverters.

12. A system to verify a connection of a termination end cap to a microinverter chain within a photovoltaic (PV) system, the system comprising:

a microinverter chain having at least one termination end connection;

an end cap attached to the termination end connection of the microinverter chain, wherein the end cap includes an embedded circuit;

a signal source coupled to the microinverter chain to provide a signal to the microinverter chain; and a system control module coupled to the PV system and configured to sense the signal and determine the connection status of the end cap based on a change between a parameter of the sensed signal and a reference parameter relative to a value of the embedded circuit.

13. The system of claim 12, wherein the system control module includes an analog-to-digital converter to sense the signal, and wherein the system control module includes a signal strength measurement circuit to measure a signal strength of the sensed signal.

14. The system of claim 12 wherein the embedded circuit is a resistor, a capacitor, or an inductor.

15. The system of claim 12, further comprising:

a switch between the signal source and the microinverter chain, wherein the switch is positionable to provide the signal in the absence of a line voltage to the microinverter chain.

16. A device to verify a connection status of an end cap to a chain of microinverters having a chain termination, the chain of microinverters within a photovoltaic (PV) system, the device comprising:

a signal source to apply a logic level low voltage signal to a chain of microinverters having a microinverter chain termination and a termination end cap;

a system control module configured to remotely sense the signal and determine the presence of the end cap based on a change between a parameter for the sensed logic level low voltage signal and a reference parameter relative to a value of a circuit that includes electronic circuit components of the end cap.

17. The device of claim 16 wherein the end cap comprises one or more of a resistor, a capacitor, or an inductor embedded into the end cap, and wherein the end cap is also configured with a deformable securement that is configured to secure the endcap to the termination of the microinverter chain through deformation of the securement during installation of the end cap to the termination of the microinverter chain.

18. The device of claim 16 wherein the system control module includes a PLC transmitter, a PLC receiver, and a signal strength measurement circuit, the measurement circuit configured to determine the difference between PLC signals sent and received through the chain of microinverters.

* * * * *